Sept. 30, 1941.    W. W. GLEASON    2,257,375
UPHOLSTERY SPRING CONSTRUCTION
Filed July 15, 1940
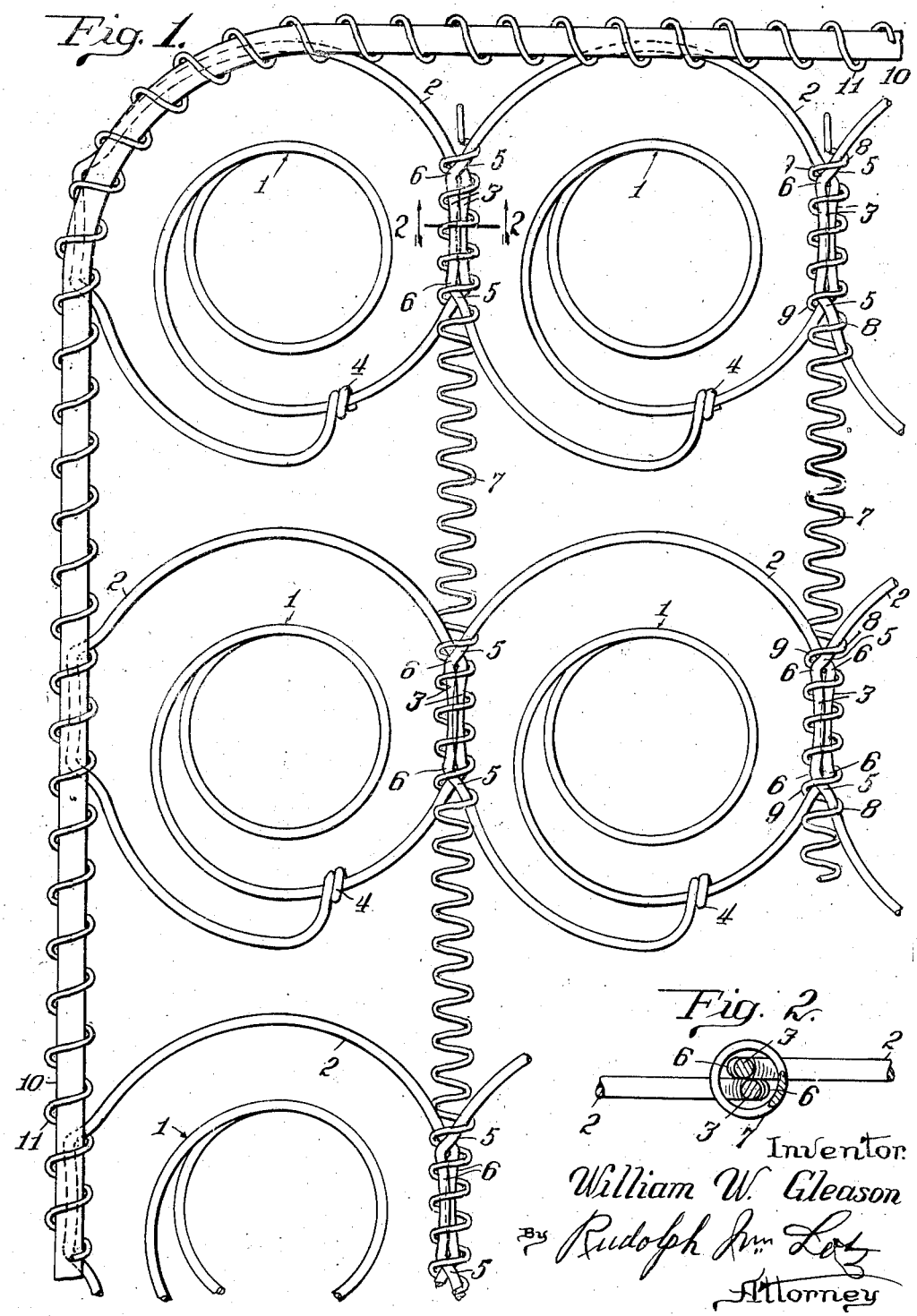

Patented Sept. 30, 1941

2,257,375

UNITED STATES PATENT OFFICE 2,257,375

UPHOLSTERY SPRING CONSTRUCTION

William W. Gleason, Chicago, Ill., assignor to Nachman Springfilled Corporation, Chicago, Ill., a corporation of Illinois Application July 15, 1940, Serial No. 345,548

3 Claims. (Cl. 5—269)

The main object of the present invention is to provide a spring construction for upholstery wherein the component upholstery springs are equipped with certain formations in their terminal coils, whereby to adapt them to be connected by means of helical tie wires in an efficient manner with ease and facility.

A particular object of the invention is to provide a structure of the type specified wherein the springs have sufficient freedom of relative movement to prevent any binding thereof against pivoted movement about the axis of the tie-wire and wherein overlapping spring portions are held against snapping past each other within the tie wire and wherein the overlapping formations are of such shape as to permit the use of helical tie-wires of very small diameter for effecting the assembly of the structure.

In the accompanying drawing illustrating a suitable embodiment of the invention:

Fig. 1 is a fragmentary plan view of a spring construction made in accordance with the invention.

Fig. 2 is a fragmentary detail sectional view of the same on an enlarged scale, taken on the line 2—2 of Fig. 1.

The spring construction as illustrated in the accompanying drawing comprises parallel rows of upholstery springs 1 of the knotted hour glass type, each of which is equipped in its terminal coils 2 with slightly inwardly projecting offset formations 3 disposed substantially equidistantly from the knot 4 thereof, and which are disposed diametrically opposite to each other.

The said bends or offsets 3 are slightly arcuate and are bowed inwardly so that their middle portions are disposed more closely adjacent to the axes of the springs than their end portions.

At each end of each of the bends or offsets 3 there is provided a relatively sharp bend 6, which is bordered by a slightly ogee curved formation 5 which merges into the body portion of the terminal coil 2.

The springs formed as above described are disposed in parallel rows with said bends 3 thereof disposed in slightly overlapped relation to each other with the said sharp bends 6 thereof overlapped upon each other to an appreciably greater degree than the portions 3.

Helical tie-wires 7 are disposed in encircling relation to the bends 3 and 6 and in part encircle the ogee curved formations 5 to thereby connect each row of springs 1 with a contiguous row or with contiguous rows of said springs in a well-known manner.

The inner diameter of the helical tie wires 7 is only slightly greater than the normal distance between the outermost points in the bends 6 at the overlapped points thereof and said tie-wires 7 embrace the ogee curved formation 5 of one spring of each pair at a point substantially at the terminus of the ogee curved formation, as shown at 8. Said tie-wires 7 encircle the other springs of each pair at points 9 spaced only slightly outwardly from the said sharp bends 6 and cooperate with the points of contact 8 to limit the movement of the springs 1 of a pair thereof away from each other transversely of the axis of said tie-wire.

The said bends 3 and 6 cooperate with the tie-wire to limit the relative movement of the springs 1 transversely of the axis of the said tie-wire 7 toward each other to a degree greater than equal to a small fraction of the inner diameter of the tie-wire 7. The arrangement is such that the overlapped spring portions encircled by the said tie-wires 7 have a certain degree of freedom of movement with relation to each other to promote free pivotal movement of the terminal coils 2 of one spring relatively to the terminal coil 2 of the companion spring within the tie-wire without, however, permitting the bends 3 and 6 of one terminal coil from passing the similar portions of the terminal coil of the companion spring.

The structures, furthermore, are such that each spring of a pair thereof coupled by means of a tie-wire 7 will be capable of slight rotation about its own axes relatively to the other in order that no binding effect may be produced to prevent a relatively free movement of the terminal coils of companion springs relatively to each other within certain narrow limits.

An advantage of the invention resides in the fact that helical tie-wires of a smaller than ordinary diameter may be used for coupling the springs of one row with the springs of an adjacent row and, furthermore, the several formations, 3, 5 and 6 are so disposed with relation to each other as to enable the tie-wire 7 to be very easily brought into encircling relation to said formations, as shown, without causing the forward end of the tie-wire to strike any of the portions of the springs encircled thereby during the rotation of said tie-wire whereby the latter is disposed in place.

In the instance illustrated the spring construction is bordered by a flat wire border frame 10 by means of a tie-wire 11 which encircles the bends 3, 5 and 6 of the marginal springs of the structure and also encircles portions of said marginal springs removed 90° from said bends 3, but this is merely an exemplary arrangement which constitutes no part of the present invention, as the spring construction may be equipped with a border frame comprised of helical tie-wire 11 alone or in connection with a suitable border frame of any desired cross-sectional shape.

It will be noted that the overlap of the bends 3 upon each other is such that no free space is left between the said bowed portions except closely adjacent to the sharp bends 6 and that said sharp bends define border openings at both ends of the bowed portions 3. The points of contact at the middle portions of the bends 3 constitute substantially the axes of the pivotal or hinge actions between companion springs of two rows of the latter.

The hinge action referred to is of a somewhat universal-joint nature in that the springs move relatively to each other in almost all directions under the influence of load upon only a part of the entire area of the spring construction.

This universal movement necessitates appreciable freedom of motion of the portions of the springs encircled by the tie-wires and the allowance for some slippage such as would result from the rotation of the springs about their own axes.

I claim as my invention:

1. A structure of the type specified comprising a plurality of parallel rows of upholstery springs each equipped in its terminal coils with shallow inwardly bowed diametrically opposed formations each bordered at its ends by relatively sharp bends, the said formations of the springs of one row being overlapped upon the similar formations of the springs of adjacent rows to cause the middle portions of said bends to overlie each other and said sharp bends to be overlapped to the extent of providing openings therebetween, and helical tie-wires encircling the overlapped portions of said springs, said tie-wires being of an inner diameter slightly greater than the spacing apart of the apexes of the said sharp bends and embracing portions of one spring of each pair at points spaced appreciably outwardly from said sharp bends and embracing the other spring of each pair at points closely contiguous to and outwardly of said sharp bends.

2. A structure of the type specified comprising a plurality of parallel rows of upholstery springs each equipped in its terminal coils with shallow inwardly bowed diametrically opposed formations merging at their ends into oppositely extending slightly ogee curved formations meeting said bowed formations in relatively sharp angular bends, the said bowed formations of the springs of one row being overlapped upon the similar bowed portions of the springs of a contiguous row to the extent that one thereof rests upon the other in part with no free space between said portions along the middle portion of each thereof, the sharp bends and portions immediately thereto being overlapped to the extent of defining openings through said overlaps at the ends of the latter, and helical tie-wires of an inner diameter equal substantially to the spacing apart of the apexes of said sharp bends disposed in encircling relation to all of the overlapped spring portions.

3. A structure of the type specified comprising a plurality of parallel rows of upholstery springs each equipped in its terminal coils with shallow inwardly bowed diametrically opposed formations merging at their ends into oppositely extending slightly ogee curved formations meeting said bowed formations in relatively sharp angular bends, the said bowed formations of the springs of one row being overlapped upon the similar bowed portions of the springs of a contiguous row to the extent that one thereof rests upon the other in part with no free space between said portions along the middle portion of each thereof, the sharp bends and portions immediately thereto being overlapped to the extent of defining openings through said overlaps at the ends of the latter, and helical tie-wires of an inner diameter equal substantially to the spacing apart of the apexes of said sharp bends disposed in encircling relation to all of the overlapped spring portions, said tie wire also embracing portions of one spring of each pair at points spaced appreciably outwardly from said sharp bends and embracing the other spring of each pair at points closely contiguous to and outwardly of said sharp bends.

WILLIAM W. GLEASON.